(12) United States Patent
Bhatia

(10) Patent No.: US 7,634,758 B2
(45) Date of Patent: Dec. 15, 2009

(54) SYSTEM AND METHOD FOR BACKING UP OPEN FILES OF A SOURCE CONTROL MANAGEMENT REPOSITORY

(75) Inventor: Rishi Bhatia, Walpole, MA (US)

(73) Assignee: Computer Associates Think, Inc., Islandia, NY (US)

( * ) Notice: Subject to any disclaimer, the term of this patent is extended or adjusted under 35 U.S.C. 154(b) by 960 days.

(21) Appl. No.: 11/070,787

(22) Filed: Mar. 2, 2005

(65) Prior Publication Data

US 2006/0200505 A1  Sep. 7, 2006

(51) Int. Cl.
G06F 9/45  (2006.01)
(52) U.S. Cl. ...................................... 717/122
(58) Field of Classification Search ................. 717/122; 707/20
See application file for complete search history.

(56) References Cited

U.S. PATENT DOCUMENTS

| | | | | |
|---|---|---|---|---|
| 5,611,050 | A * | 3/1997 | Theimer et al. | 709/202 |
| 5,974,563 | A * | 10/1999 | Beeler, Jr. | 714/5 |
| 6,088,694 | A | 7/2000 | Burnes et al. | 707/8 |
| 6,298,319 | B1 | 10/2001 | Heile et al. | 703/26 |
| 6,704,755 | B2 * | 3/2004 | Midgley et al. | 707/204 |
| 2003/0208622 | A1 * | 11/2003 | Mosier | 709/244 |
| 2004/0215757 | A1 * | 10/2004 | Butler | 709/223 |
| 2004/0243993 | A1 * | 12/2004 | Okonnen et al. | 717/168 |

FOREIGN PATENT DOCUMENTS

| EP | 0 778 527 A | 6/1997 |
|---|---|---|
| EP | 0 899 662 A | 3/1999 |

OTHER PUBLICATIONS

"Enterprise CCM™ Change and Configuration Management for Enterprise Applications," © 2000 Computer Associates International, Inc. (2 pages).
"White Paper Enterprise Change Management 101," © 2003 Computer Associates International, Inc. (13 pages), Feb. 24, 2003.
Notification of Transmittal of the International Search Report and the Written Opinion of the International Searching Authority for International application No. PCT/US2006/007521 filed Mar. 2, 2006 (13 pages), Aug. 1, 2006.
Griffels Associates Limited: "*TIMS3 Case Study—EDMS Integration*", XP002390042, pp. 1-25, Online, Apr. 2002, retrieved from http://www/tims3.com/OnlineGuides/GiffelsCaseStudy.pdf, Jul. 12, 2006.

* cited by examiner

*Primary Examiner*—John Chavis
(74) *Attorney, Agent, or Firm*—Baker Botts L.L.P.

(57) ABSTRACT

A software agent, system and method for backing up open files of a source control management repository are provided. The agent includes a context information agent for retrieving context information including a location of the at least one open file from the source control repository; and a file movement agent for backing up the at least one open file from the location to a first server adapted for backing up and storing the at least one open file.

19 Claims, 4 Drawing Sheets

SYSTEM AND METHOD FOR BACKING UP OPEN FILES OF A SOURCE CONTROL MANAGEMENT REPOSITORY

BACKGROUND

1. Field

The present disclosure relates generally to data processing and computing systems, and more particularly, to a software agent, system and method for backing up open files of a source control management repository.

2. Description of the Related Art

The IT world is in a constant state of flux with new technologies, applications and platforms being developed and evolving all the time. In this ever-changing environment, application development managers and Chief Information Officers need to eliminate as much risk as possible. Most organizations must manage or support complex multiplatform applications that span the enterprise, including the mainframe server. For example, an online ticketing program for an airline has a web front-end. Its browser-based interface is connected to a back-office application on a UNIX server that also interacts with a DB2 database on the mainframe. While the application has components on several different platforms, it is still considered a single application because it serves a single business purpose—managing airline ticketing processing.

Additionally, the teams working on these complex, multi-tiered projects may be deployed around the world to take advantage of "follow-the-sun development". For example, at the end of their day, a team in California hands off its development projects to a team in Japan, who then turns it over to a third team in the UK, and that group turns it over to a team in New York and so on.

Add these trends to the fact that every application now has a web front-end—with all the associated HTML pages and web content—to capitalize on Internet-driven business opportunities, and it is clear that enterprise Change Control Management (CCM) solutions have emerged as essential infrastructure components in the enterprise-wide application development arena.

Change Control Management software provides life cycle management, source version control and configuration management capabilities. Conventional source control management products are designed to manage code changes as they are checked back into the source control repository. With today's distributed environments and multiple projects underway, developers have many work-in-progress (WIP) projects on their machines that do not make it back to the source control repositories for a long period of time. Every developer and organization is at risk for not managing what is outside the checked-in file repository.

Developers work on many projects that contain multiple files that are not checked back into the source control management software for a long time. Currently, developers have to manually remember the physical location from where the files were checked out and manually backup these files. Then, the developers have to remember the correlation between the physical locations of the files, the software packages they are associated with, and actual backed-up locations. With multiple machines per user and multiple projects per user, the problem of keeping track of the checked out files for all the different projects is a manual and very tedious process for a single developer and it is even harder to achieve this at an enterprise level.

Additionally, developers are at great risk of losing these unmanaged open or checked out files since they must be backed-up manually by each individual developer. Currently, developers manually backup any open files and manually keep track of the CM (control management) context (e.g., server name, server address, etc.), physical locations of these files and the manual maintenance of the backups.

Therefore, a need exists for techniques to allow users, developers and administrators to easily and conveniently manage checked out or open files from a source control repository. Furthermore, a need exists for techniques to automatically backup open files and their context.

SUMMARY

A software agent, system and method for backing up open files of a source control management repository are disclosed. The backup agent initiates on demand or at a pre-specified time a backup of all the open files from CM (Control Management) servers, which are registered with the backup agent. The agent retrieves the physical location for the open files from the CM product, and backs up the open files on a storage device. In addition, the agent stores the CM context via an open file report. Furthermore, the agent acts as a bridge between the LCM (Life Cycle Management) products and backup servers by using CM context for correlating the open file report with a specific LCM server.

In one aspect of the present disclosure, an agent for backing up at least one open file of a source control repository is provided, the agent including a context information agent for retrieving context information including a location of the at least one open file from the source control repository; and a file movement agent for backing up the at least one open file from the location to a first server adapted for backing up and storing the at least one open file.

In another aspect of the present disclosure, a system for backing up at least one open file of a source control repository is provided, the system including at least one client coupled to the source control repository for editing open files; a first server for backing up and storing at least one open file; and a first agent for backing up the at least one open file including a context information agent for retrieving context information including a location of the at least one open file from the source control repository; and a file movement agent for backing up the at least one open file from at least one client to the first server.

In a further aspect of the present disclosure, a method for backing up at least one open file of a source control repository is provided, the method including the steps of requesting context information for at least one user of at least one open file; receiving context information relating to at least one open file of the at least one user; determining a location of the at least one open file from the context information; retrieving the at least one open file; and storing the at least one open file.

In another aspect of the present disclosure, a set of computer-executable instructions for backing up at least one open file of a source control repository is provided, the computer-executable instructions including the steps of requesting context information for at least one user; receiving context information relating to at least one open file of the at least one user; determining a location of the at least one open file from the context information; retrieving the at least one open file; and storing the at least one open file.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. It is to be understood for the purposes of this disclosure that open files, or checked out files, are software files that are removed from a source control repository of an application to be worked on by a user, e.g., a developer, programmer, etc.

A software agent, system and method for backing up open files of a source control management repository are provided. It is to be appreciated that an agent, as is known in the art, is a software program that gathers information and/or performs some other service without the immediate presence of a user, and optionally, performs these actions on some regular schedule. On demand or at a pre-specified time, the backup agent will initiate a new job to backup all the open files from CM (Control Management) servers, e.g., AllFusion™ commercially available from Computer Associates, Inc, of Islandia, N.Y., registered with the backup agent. This agent will retrieve the physical location for the open files from the CM product, and back up the open files on a storage device. In addition to the open or checked out files, the agent will store the CM context via an open file report. This agent will act as a bridge between LCM (Life Cycle Management) products and backup servers. CM context is used for correlating an open file report with a specific LCM server.

Figure 1:
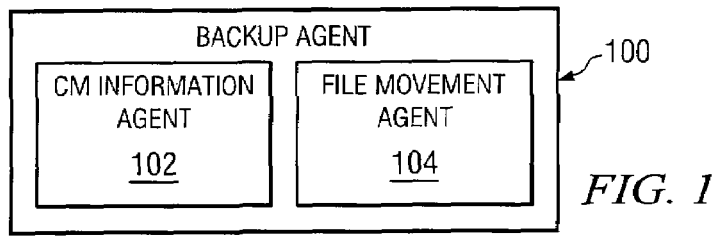
FIG. 1 is a block diagram of an agent for backing up open files of a source control management repository in accordance with an embodiment of the present disclosure.

In a simplified form, an agent of the present disclosure will backup (1) open CM files; and (2) CM Context. The CM context will include the LCM server name, server address and the broker name and the CM (Change Management) Open file report. Referring to FIG. 1, the backup agent 100 will include a CM information agent 102 and a file movement agent 104.

CM Information agent 102 will communicate with the LCM server including the control source repository, e.g., an AllFusion™ Harvest™ server, and will interpret the open file report returned from the LCM server. The file movement agent 104 is responsible for backing up the files from a client machine to a media drive through a backup server, which will be described in more detail below.

Figure 2:
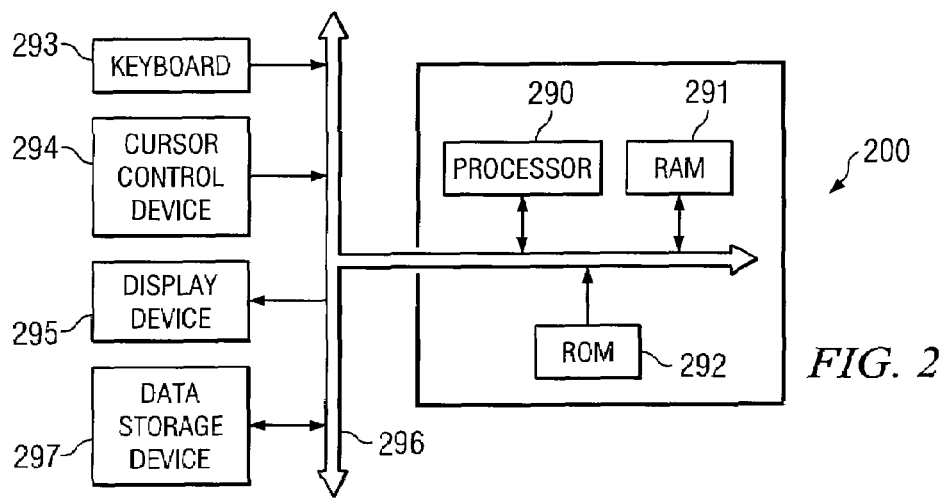
FIG. 2 is an exemplary computing system for implementing the agent of the present disclosure.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine 200 comprising any suitable architecture such as a personal computer, a workstation or server. Referring to FIG. 2, preferably, the machine 200 is implemented on a computer platform having hardware such as one or more central processing units (CPU) 290, a random access memory (RAM) 291, a read only memory (ROM) 292 and input/output (I/O) interface(s) such as a keyboard 293, cursor control device 294 (e.g., a mouse or joystick) and display device 295. A system bus 296 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform by various interfaces and bus structures, such as a parallel port, serial port or universal serial bus (USB), for example, additional storage devices 297 and a printer.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer 200 may operate in a networked environment using logical connections to one or more remote computers. The remote computer may be a personal computer, a server, a router, a mainframe, a network PC, a peer device or other common network node, and typically includes many or all of the elements described above relative to the computer 200. It is to be appreciated that the network may be a local area network (LAN), wide area network (WAN), the Internet or any known network that couples a plurality of computers to enable various modes of communication via network messages. For example, the network environment may be a corporate intranet including a single server and multiple personal computers housed within a single facility, or alternatively, multiple servers with multiple personal computers located in various geographic locations.

Figure 3:
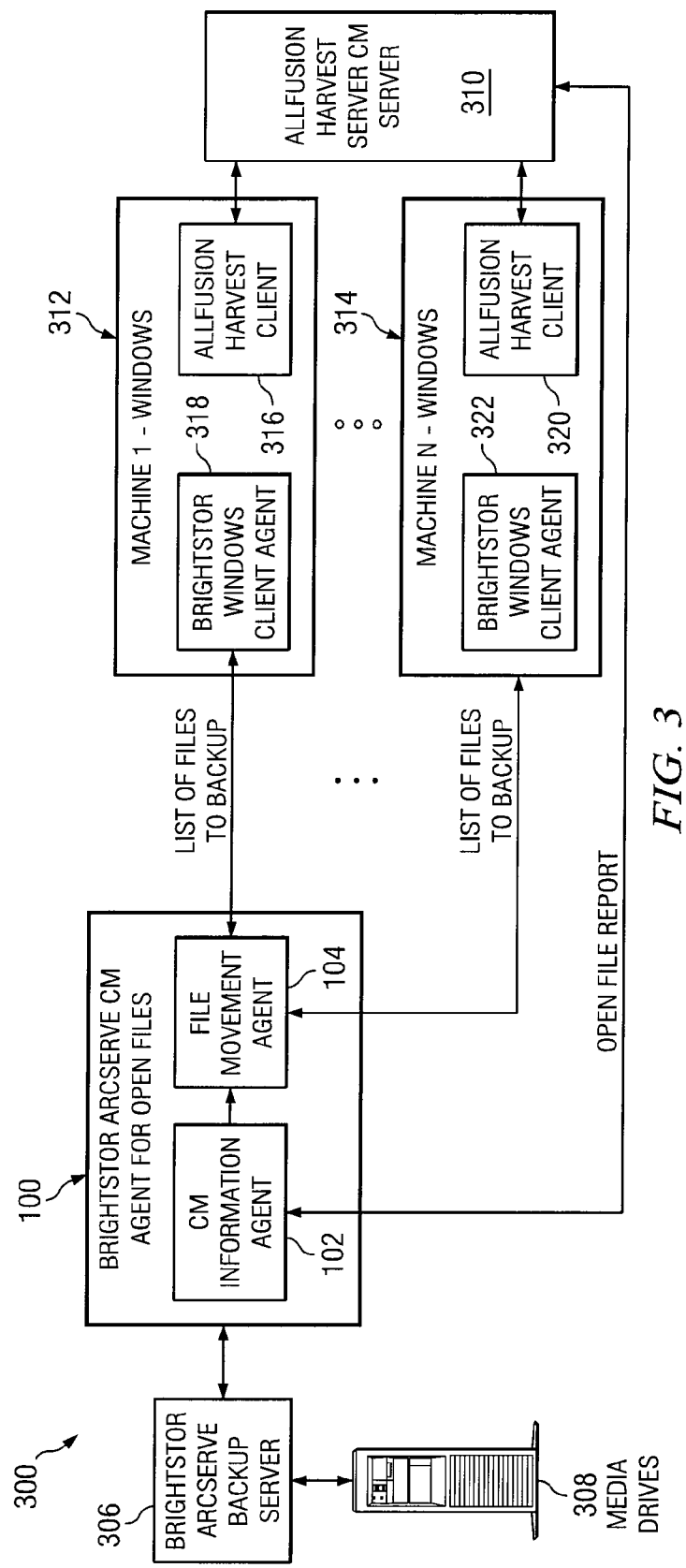
FIG. 3 is a block diagram of a system for backing up open files of a source control management repository in accordance with an embodiment of the present disclosure.

FIG. 3 is a block diagram illustrating a system 300 for backing up open files of a source control management repository employing the backup agent 100. The system 300 includes a backup server 306 for controlling the overall operation of backing up and restoring files and a repository 308 for the actual storing of the files, e.g., a hard drive, optical drive or any known media drive. The system further includes a control change management (CCM) server 310 for controlling software change and configuration management and a plurality of user machines 312, 314, e.g., clients. Each of the user machines 312, 314 further include a CCM client 316, 320 for interacting with the CCM server 310 and a backup client agent 318, 322 for interacting with the file movement agent 104 of the backup agent 100.

Figure 4:
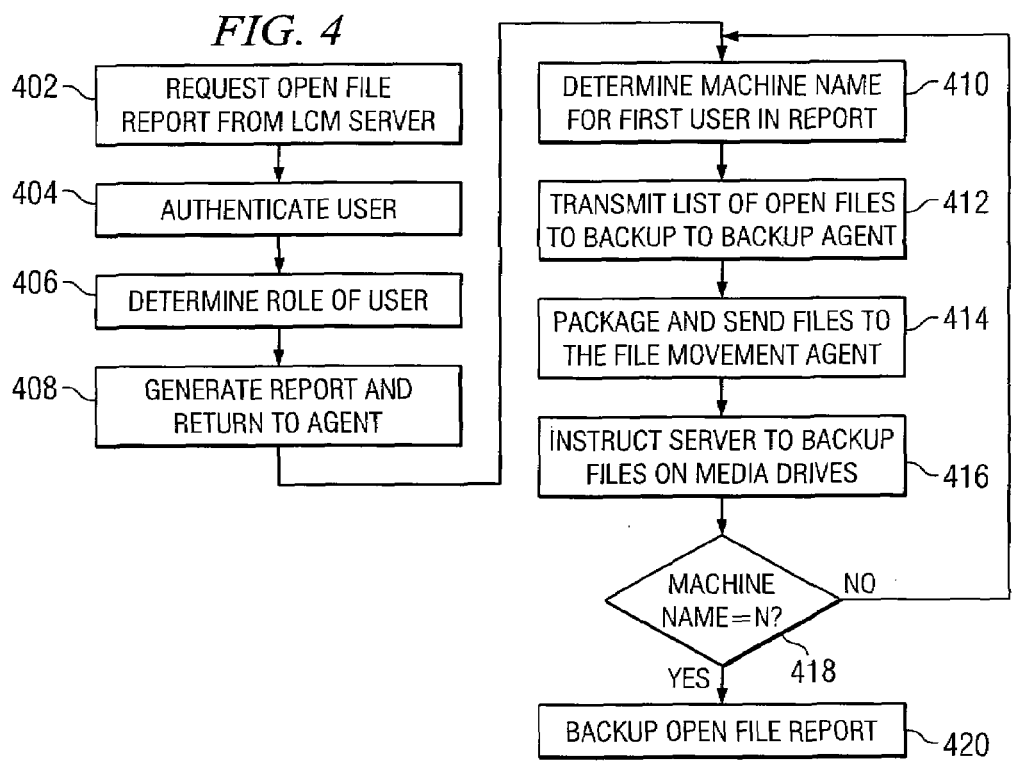
FIG. 4 is a flowchart for illustrating a method of backing up open files of a source control management repository in accordance with an embodiment of the present disclosure.

With reference to FIGS. 3 and 4, a method for backing up open files of a source control management repository will now be described. Initially, the backup agent 100 will request or query the CCM server 310 to first generate and send an open file item report (step 402). The details of generating and presenting the open file items report, e.g., a checked out item report, are described in concurrently filed co-pending U.S. patent application under Express Mail Certificate No. EV 464570655 US entitled "METHOD AND SYSTEM FOR FILE MANAGEMENT OF A SOURCE CONTROL MANAGEMENT REPOSITORY", the contents of which are hereby incorporated by reference in its entirety. For clarity of the present disclosure, some of the step for generating the open file items report will be described.

The CCM server 310 will first authenticate the user (step 404). The report will be generated only if the supplied user name and password has the required privileges for accessing the data. If the credentials do not have sufficient privileges, the CCM server 310 will return back to the backup agent 100 an error message indicating that access is denied and error description as to whether the user name or password is invalid. Otherwise, if the user has sufficient privileges the CCM server 310 will determine the role of the user (step 406). For example, if the user is an administrator, the administrator will be able to view information for all the client machines that are registered with this agent. The administrator will be able to schedule backups and check on backups for all the clients 312, 314 registered with a particular server. On the other hand, an individual user will be only able to view and perform tasks for his client machines.

Next, the CCM server 310 will compile the information and generate an open file report, also known as a checked out item report. The open file items report may include the following information:
  i. Group Name
  ii. User Name
  iii. Broker Name
  iv. Repository Name
  V. Project Name
  vi. State Name
  vii. Package group
  viii. Package Name
  ix. Physical location of the checked out file (\\MachineName\Fully Qualified Path)
  x. Actual repository location of the file in the LCM (View Path)
  xi. Date when the file was checked out
  xii. Other Misc information (branched files, versions, Status (Released or not), Creator, Created on, Modifier, Modified on).

The report will then be formatted in a predetermined format, e.g., an XML file, and the report is returned back to the backup agent 100 (step 408).

Next, the backup agent 100 will find out the machine name 312 for the first user in the report (step 410). The file movement agent 104 will send the list of files to be backed-up to the backup client agent 318 (step 412) of client 312. The backup client agent 318 will package and send the files back to the file movement agent 104 in the backup agent 100 (step 414).

Next, the backup agent 100 will instruct the backup server 306 to back these files on a media drive 308 (step 416). After all the open files have been backed up, the backup agent 100 will determine if the machine being backed-up is the last one listed in the open file items report (step 418), and if it is not, the backup agent 100 will return to step 410 and determine the name of the next machine. The backup agent 100 will continue this process for all the users in the open file report. When all machines for all users are backed-up, the backup agent 100 will instruct the backup server 306 to also backup the open file report for the CM context information (step 420). The backup agent 100 will save the CM context information along with any manual or automatic backups of the CM clients 312, 314. The context information will include the control management server name, server address and the broker name for which the open CM file report is saved.

The architecture of system 300 is flexible because backup server 306, backup agent 100 and the control management server 310 can be all on different machines, all on the same machine or any combination thereof. Also, the backup agent for Open files may integrate with a backup server manager/portal and will facilitate services like scheduling, automatic backups, backup restoration, backup status, reports, rotation options, media management, managing CM context and other admin capabilities for this new agent.

Figure 5:
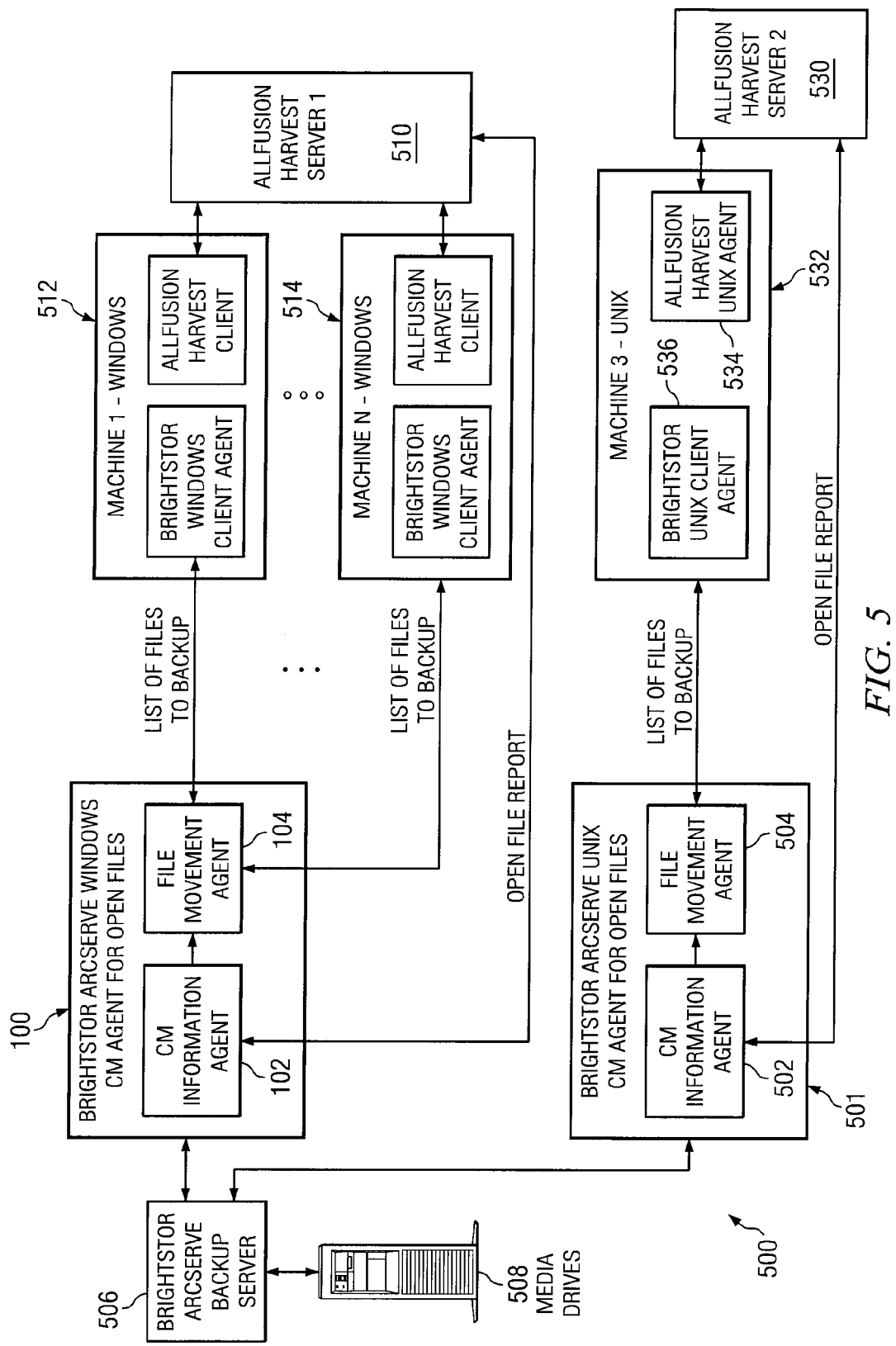
FIG. 5 is a block diagram of a system for backing up open files of a source control management repository in accordance with another embodiment of the present disclosure.

Referring to FIG. 5, a block diagram of a system 500 for backing up open files of a source control management repository in accordance with another embodiment of the present disclosure is illustrated. System 500 includes two backup open file agents one for Windows™ 100 and one for UNIX 501. Both of these agents use the same backup server 506 for backing up the open files. The difference from FIG. 3 is that the backup open file agent for UNIX 501 is responsible for communicating with all the UNIX CM clients such as Machine3 532. The CM server for UNIX 530, e.g., AllFusion Harvest Server2, communicates with CM UNIX client 534, e.g., AllFusion Harvest UNIX Agent, for all CM related activity on Machine3 532. The overall process flow is same as in FIG. 4.

Figure 6:
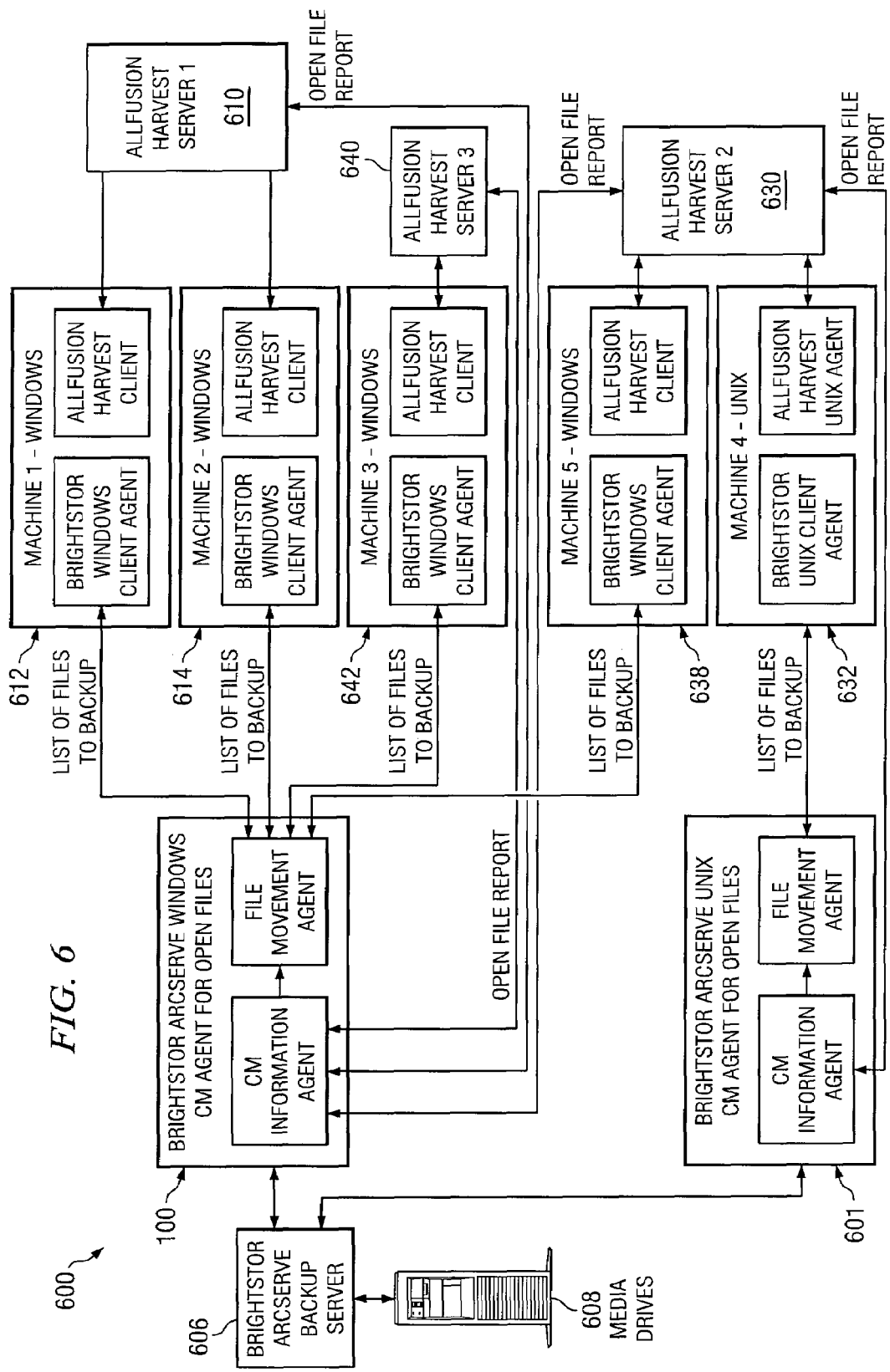
FIG. 6 is a block diagram of a system for backing up open files of a source control management repository in accordance with a further embodiment of the present disclosure.

Referring to FIG. 6, a block diagram of a system 600 for backing up open files of a source control management repository in accordance with a further embodiment of the present disclosure is illustrated. The system 600 of FIG. 6 depicts scalability of the architecture where two backup agents for open files 100, 601 can communicate with multiple CM servers and clients. In this case, CM server 610, e.g., Harvest Server1, has two Windows™ clients 612, 614 that communicate through backup agent for Windows™ 100; CM server 640, e.g., Harvest Server3, has one Windows™ client 642 that communicates through backup agent for Windows™ 100; and CM server 630, e.g., Harvest Server3, has two clients: one for UNIX 632 that communicates through backup agent for UNIX 601 and another client for Windows™ 638 that communicates through backup agent for Windows™ 100.

Preferably, the agent will be invoked on a time schedule. The agent may also be invoked manually through a plug-in available through a Backup Manager interface residing on the backup server. In the Backup Manager, the new backup agent for open files will appear in the source tree for the machine it is running on. In addition, the Backup Manager may display all the agents registered with it, so that the user may specify and or configure the backup schedules.

The expand command for this agent will display all the LCM Servers registered with the backup agent. The Backup Manager will allow a user to perform the following functions: take backups of one or all the CM Servers registered with the agent; automatically schedule a backup; perform differential or full backups; and specify the rotation options. Rotation options allow for configuration of a rotation scheme for a backup job. For example, rotation scheme configurations may include the following options: Full backup, Incremental backup, Differential backup, no backup on a certain day and GFS rotation schemes.

Since the backup agent 10 will also backup the CM context information, the backup server 102 will also have the capability to restore any or all of the backed-up files. A restore manager accessible through the backup server will restore CM open files to a previously backed-up snapshot. The restore manager will restore the physical files and issue commands to the CM server 310 validating the CM context that was backed-up along with the physical files. The CM context information is Repository Name, Project Name, State Name, Package group, Package Name. The backup agent for open files 100 will instruct the CM server 310 as tow hat files are being restored and to what CM context it belongs to. If the CM context package name has been removed then this restore process will create the CM context so the files are restored in the same state physically as well with the same context in the CM product.

The restore manager will allow the user to perform the following functions: restore all the files for a particular CM server from a particular backup; restore all the files for a particular user; restore selected files for a particular user; and restore to a different location. All the restore options will provide a sub-option to restore over existing files, debug/trace logs will be provided as consistent with the backup server architecture.

All of the restore options are contingent with an authentication and consistency check with the CM server. Before restoring any files, a consistency check will be performed. Restoration of the CM context will be done as the first step in restoring files from a backup. If the CM server is not able to restore context, the user will be provided with an option whether they still want to restore the physical files. In this case, only the physical files will be restored with no link or registration that the files are open in the CM server. Also, if the files are already checked in, meaning the files are not open in the CM server, then the backup agent will not be able to restore the context. The user can choose to perform the second step, that is physically copying the file from the backup device to their media drive. Furthermore, the backup agent will authenticate against the CM server to make sure that the user is still a valid CM user and that the user has the sufficient privileges to perform the task.

An agent, systems and methods for backing up open or checked out files of a source control repository has been described. The backup agent for open files will integrate with a backup server manager/portal and will facilitate services like scheduling, automatic backups, backup restoration, backup status, reports, rotation options, media management, managing CM context and other administrator capabilities for this new agent. The new agent will also allow a backup server to backup files which are actively opened by the user (i.e., files that are open in an editor).

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A tangible computer storage medium encoded with a program of instructions executable by a processor, the program of instructions comprising:
   a context information agent for retrieving context information associated with an open file, wherein:
      the open file was checked out of a source control repository; and
      the context information comprises a location of the at least one open file and the identity of the source control repository; and
   a file movement agent for backing up:
      the at least one open file from the location to a first server adapted for backing up and storing the at least one open and file; and
      the context information to the first server.

2. The computer storage medium encoded with the program of instructions as in claim 1, wherein the context information further comprises a source control repository server name, a source control repository server address and a broker name.

3. The computer storage encoded with the program of instructions as in claim 2, wherein the context information is stored in a file report.

4. The computer storage encoded with the program of instructions as in claim 1, wherein a first server includes at least one media drive for storing the at least one open file.

5. The computer-readable medium encoded with the program of instructions as in claim 1, wherein the at least one open file comprises at least one file that has been removed from a source control repository.

6. A system for backing up at least one open file of a source control repository, the system comprising:
   a first server comprising at least one storage device;
   a context information agent for retrieving context information associated with the open file, wherein:
      the open file was checked out of the source control repository; and
      the context information comprises a location of the at least one open file and the identity of the source control repository; and
   a file movement agent for backing up the at least one open file to the first server.

7. The system as in claim 6, wherein the context information further comprises a source control repository server name, a source control repository server address and a broker name.

8. The system as in claim 7, wherein the context information is stored in a file report.

9. The system as in claim 6, wherein the first server includes at least one media drive for storing the at least one open file.

10. The system as in claim 6, further comprising a client agent operable to package and send the at least one open file to the file movement agent.

11. The system as in claim 10, wherein the at least one further comprises a control management client for storing the location of the at least one open file.

12. The system as in claim 6, wherein the at least one open file comprises at least one file that has been removed from a source control repository.

13. A computer-implemented method for backing up at least one open file of a source control repository, the computer-implemented method comprising:
   requesting context information for at least one user of at least one open file, wherein the at least one open file was checked out of the source control repository by the at least one user;
   receiving context information relating to at least one open file of the at least one user, wherein the context information comprises the identity of the source control repository;
   determining, by a computer system, a location of the at least one open file from the context information;
   retrieving the at least one open file; and
   storing the at least one open file and the context information on a server.

14. The computer-implemented method as in claim 13, wherein the context information further comprises a source control repository server name, a source control repository server address and a broker name.

15. The computer-implemented method as in claim 14, further comprising restoring the at least one open file to the location determined from the context information.

16. The computer-implemented method as in claim 13, wherein the at least one open file comprises at least one file that has been removed from a source control repository.

17. A tangible computer storage medium encoded with a program of instructions for, upon execution by a processor:
    requesting context information for at least one user;
    receiving context information relating to at least one open file of the at least one user, wherein the at least one open file was checked out of the source control repository by the at least one user;
    determining a location of the at least one open file from the context information;
    retrieving the at least one open file; and
    storing the at least one open file and the context information on a server.

18. The tangible computer storage medium encoded with the program of instructions according to claim 17, wherein the context information further comprises a source control repository server name, a source control repository server address and a broker name.

19. The computer-readable medium encoded with the program of instructions according to claim 17, wherein the at least one open file comprises at least one file that has been removed from a source control repository.

* * * * *

UNITED STATES PATENT AND TRADEMARK OFFICE
CERTIFICATE OF CORRECTION

PATENT NO. : 7,634,758 B2
APPLICATION NO. : 11/070787
DATED : December 15, 2009
INVENTOR(S) : Rishi Bhatia It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1323 days.

Signed and Sealed this

Ninth Day of November, 2010

David J. Kappos
*Director of the United States Patent and Trademark Office*